(12) United States Patent
Hong

(10) Patent No.: US 8,488,057 B2
(45) Date of Patent: Jul. 16, 2013

(54) METHOD AND APPARATUS FOR DEJUDDERING IMAGE DATA

(75) Inventor: Sunkwang Hong, Toronto (CA)

(73) Assignee: ATI Technologies ULC, Markham (CA)

( * ) Notice: Subject to any disclaimer, the term of this patent is extended or adjusted under 35 U.S.C. 154(b) by 900 days.

(21) Appl. No.: 12/325,641

(22) Filed: Dec. 1, 2008

(65) Prior Publication Data

US 2010/0134680 A1  Jun. 3, 2010

(51) Int. Cl.
*H04N 7/01* (2006.01)

(52) U.S. Cl.
USPC ........... 348/441; 348/447; 348/448; 348/451; 348/452; 345/87; 345/98; 345/102

(58) Field of Classification Search
USPC ................. 348/441, 447, 448, 451, 452, 607, 348/624; 345/87, 98, 102
See application file for complete search history.

(56) References Cited

U.S. PATENT DOCUMENTS

| | | | |
|---|---|---|---|
| 6,201,577 B1 | 3/2001 | Swartz | |
| 6,570,554 B1 * | 5/2003 | Makino et al. | 345/102 |
| 7,075,581 B1 | 7/2006 | Ozgen et al. | |
| 7,203,620 B2 | 4/2007 | Li | |
| 7,235,934 B2 | 6/2007 | Hung et al. | |
| 7,274,403 B2 | 9/2007 | Neuman et al. | |
| 7,349,026 B2 | 3/2008 | Wyman et al. | |
| 2006/0197732 A1 * | 9/2006 | Oyaizu et al. | 345/99 |
| 2006/0280249 A1 | 12/2006 | Poon | |
| 2007/0103418 A1 * | 5/2007 | Ogino et al. | 345/89 |
| 2007/0115233 A1 | 5/2007 | Endo et al. | |
| 2007/0236439 A1 | 10/2007 | Chen et al. | |
| 2007/0236603 A1 * | 10/2007 | Itoh et al. | 348/441 |
| 2007/0263121 A1 * | 11/2007 | Take et al. | 348/448 |
| 2008/0122983 A1 * | 5/2008 | Sato et al. | 348/687 |
| 2008/0238854 A1 * | 10/2008 | Kimura | 345/98 |
| 2008/0284768 A1 * | 11/2008 | Yoshida et al. | 345/208 |
| 2009/0080789 A1 * | 3/2009 | Shoji | 382/254 |
| 2009/0184916 A1 * | 7/2009 | Miyazaki et al. | 345/102 |
| 2010/0013991 A1 * | 1/2010 | Miyazaki et al. | 348/452 |

OTHER PUBLICATIONS

De Haan et al., "IC for Motion-Compensated 100 Hz TV with Natural-Motion Movie-Mode", IEEE Transactions on Consumer Electronics, vol. 42, No. 2, pp. 165-174, (May 1996).
Hong et al., "Advanced Method for Motion-Blur Reduction in LCDs", SID 05 Digest, Society of Information Display, pp. 466-469, (Boston, USA, 2005).
Hong et al., "Enhancement of Motion Image Quality in LCDs", SID 04 Digest, Society of Information Display, pp. 1353-1355, (Seattle, USA, 2004).
Hong et al., "Motion Image Enhancement of LCDs", Proc. IEEE Internaitonal Conference on Image Processing (ICIP'05), (Genova, Italy, 2005).
Hong et al., "Motion-Interpolated FRC Algorithm for 120Hz LCD", SID 06 Digest, Society of Information Display, pp. 1892-1895, (San Francisco, USA, 2006).
Kim et al., "Black Frame Insertion Technique with Charge Share", Eurodisplay 2005, (Edinburgh, Scotland, Sep. 2005).
Kurita, "Moving Picture Quality Improvement for Hold-Type AM-LCDs", SID 2001 Digest, pp. 986-989, (2001).

\* cited by examiner

*Primary Examiner* — Jefferey Harold
*Assistant Examiner* — Humam Satti
(74) *Attorney, Agent, or Firm* — Volpe and Koenig, P.C.

(57) ABSTRACT

A method and apparatus of dejuddering image data includes receiving a video data signal that includes a plurality of successive source frames. A first source frame of the plurality of successive source frames is displayed a predetermined number of times. A first black frame is displayed, and successive source frames are displayed.

17 Claims, 7 Drawing Sheets

METHOD AND APPARATUS FOR DEJUDDERING IMAGE DATA

FIELD OF INVENTION

The present invention is directed to image data dejuddering.

BACKGROUND

In data image processing, it is sometimes necessary to perform a frame rate conversion in order to properly display the image. For example, a video may be recorded at a frequency of 24 Hertz (Hz), but a display that will be utilized to display the video may operate at a different frequency, such as 50 or 60 Hz. Accordingly, due to the difference between the recording frequency and the display frequency, a moving image may appear to have a judder when displayed.

With the advent of high definition (HD) video, and HD liquid crystal displays (LCDs), the utilization of frame rate conversion becomes even more important. Since LCDs are often backlit by cold cathode fluorescent lamps (CCFLs), they are lit more continuously than a traditional cathode ray tube (CRT), which utilizes a stroboscopic method of lighting the screen. This type of driving method is referred to as hold-type driving, where each frame is displayed for the same duration as the refresh rate. This method may result in worse juddering compared to impulsive driving which is the common driving method for a CRT. Because a video image displayed on an LCD that is continuously backlit may appear juddery to a human eye, frame rate conversion may be desirable to correct this.

It would therefore be beneficial to provide a method and apparatus that could dejudder image data.

SUMMARY

A method and apparatus of dejuddering image data is disclosed. The method includes receiving a video data signal that includes a plurality of successive source frames. A first source frame of the plurality of successive source frames is displayed a predetermined number of times. A first black frame is displayed, and successive source frames are displayed.

DETAILED DESCRIPTION

The present invention relates to a method and apparatus for processing image data. More particularly, the present invention relates to dejuddering image data such as video.

Figure 1:
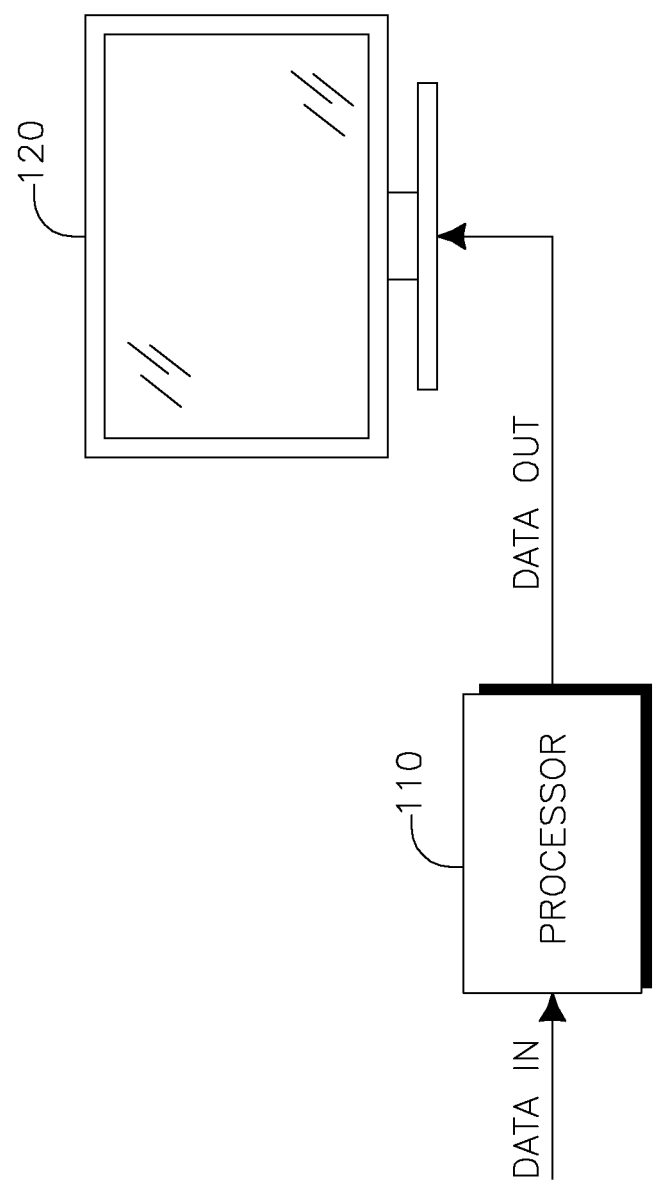
FIG. 1 is a block diagram of an apparatus for dejuddering image data including a processor and a display.

FIG. 1 is a block diagram of an apparatus 100 for dejuddering image data including a processor 110 and a display 120. As shown in FIG. 1, the processor 110 is configured to receive image data in and produce a dejuddering image data out. This processed hybrid image data out may be forwarded to the display 120 where it may be viewed.

Figure 2:
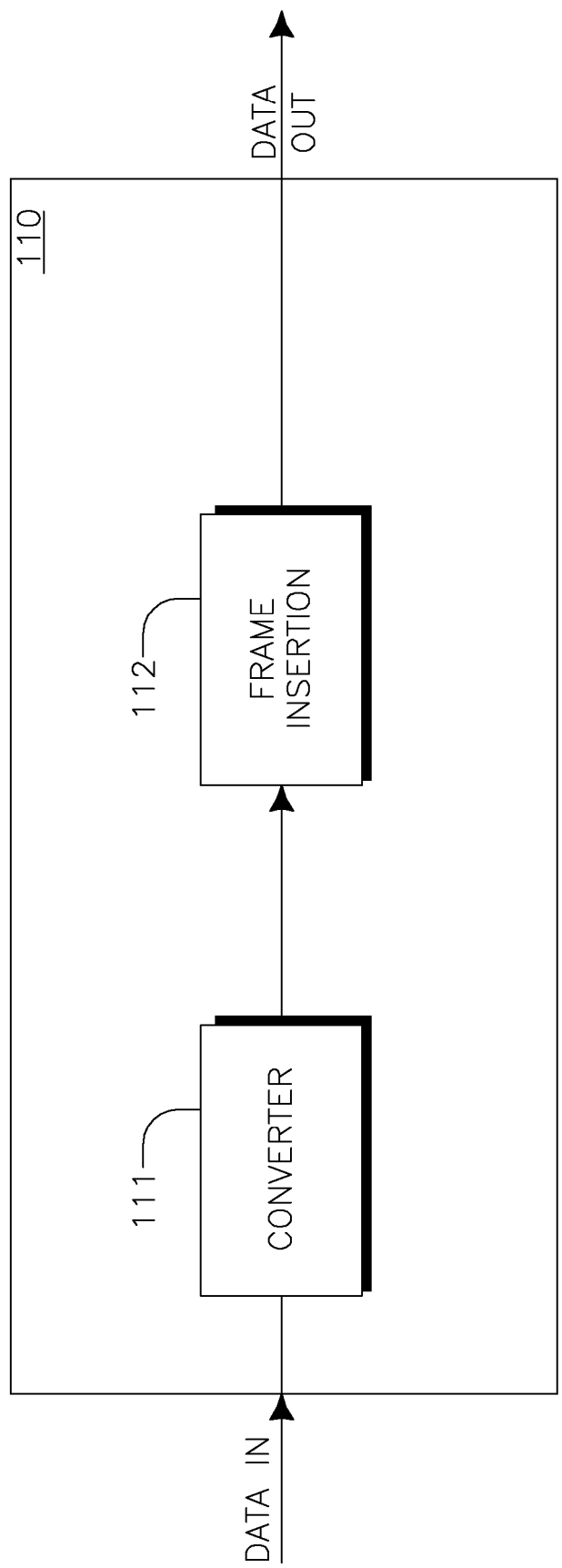
FIG. 2 is a block diagram of the processor of FIG. 1.

FIG. 2 is a block diagram of the processor 110 of FIG. 1. The processor 110 includes a converter block 111, and a frame insertion block 112 in communication with the converter block 111. The data received by the converter block 111 is, in one example, video image data.

Although the steps performed by each block of the processor 110 will be described in more detail below, briefly, the converter block 111 receives the initial input data and converts it if necessary. For example, as mentioned above, a standard film may be filmed and projected at twenty-four (24) frames per second (24 Hz). In order to display the image properly on a display operating at 50 or 60 Hz, the 24 frames per second has to be converted. One of the ways to do this is to display the first frame twice and the second frame three times, which is referred to as "2:3 pulldown". In addition, conventional displays, (e.g., CRTs), utilize an "interlaced" display pattern, which displays every other line on the screen at each interval. However, an HDTV may be capable of displaying the image in a "progressive" (p) manner, and can therefore display the original 24 frames progressively (24p).

Accordingly, if the initial data is of a 2:3 pull-down film material type, the converter block 111 converts it to 24p data. The converted data is then forwarded by the converter block 111 to the frame insertion block 112. The frame insertion block 112 then performs a frame insertion in accordance with one of the dejuddering methods described below and forwards the signal on, such as to the display 120.

Figure 3:
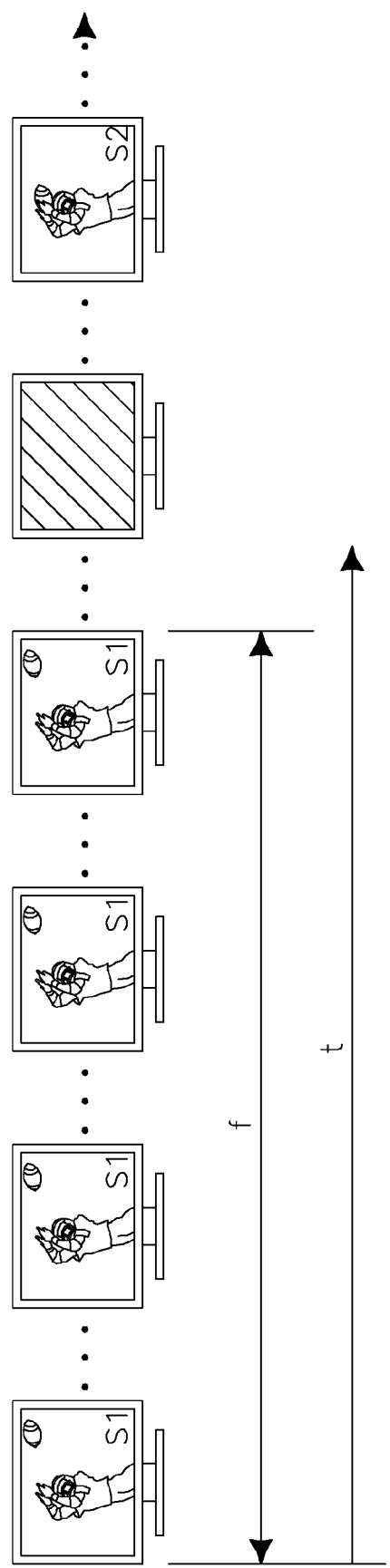
FIGS. 3-7 are graphical representations of example methods of dejuddering.

For example, in one method, the frame insertion block 112 may repeat a frame, for example, four times, insert a black frame into the signal and then insert the next frame. FIG. 3 is a graphical representation 300 of an example method of dejuddering using this method. As shown in FIG. 3, time (t) is indicated by the line 't', a first frame (S1), which may be a 24 Hz frame, is shown as being repeated four times over a period (f), a black frame is then inserted and displayed, and the next frame (S2) is inserted and displayed. The process is then repeated for S2, and so on for each successive frame. The period 'f' may vary depending on the type of engine that is being utilized for display, (e.g., a 120 Hz engine or a 240 Hz engine). In the example where a 120 Hz engine is utilized, the period 'f' would be ¹⁄₁₂₀ of a second.

Figure 4:
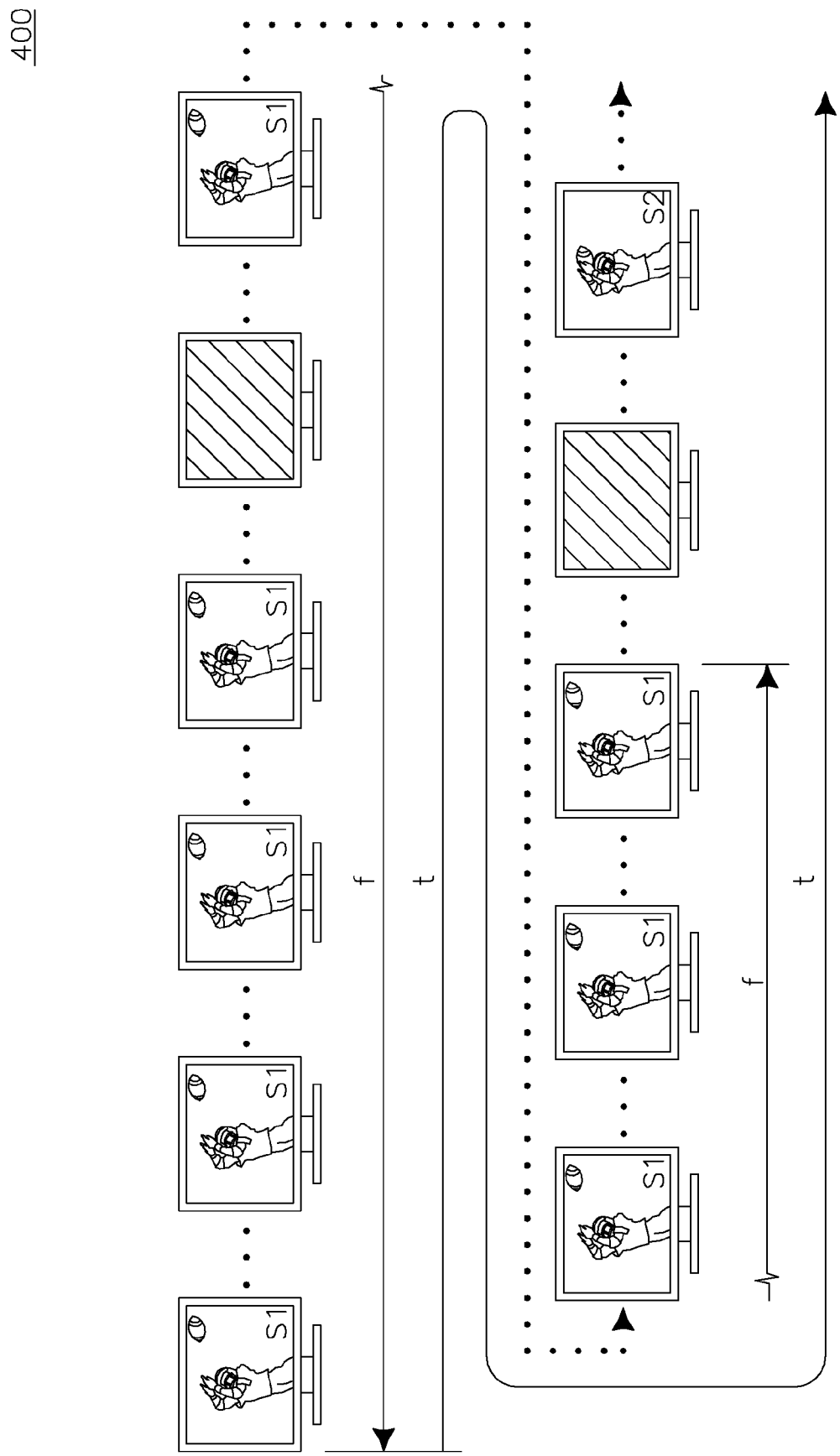

FIG. 4 is a graphical representation 400 of an example method of another dejuddering method. As shown in FIG. 4, the first frame (S1) is repeated four times, a black frame is inserted, the first frame (S1) is repeated another four times, and another black frame is inserted over the period 'f'. In this example, the frequency may be 240 Hz. The method then repeats for the next frame (S2). It should be noted that, although two black frames are shown as being inserted before the next source frame is displayed, the amount, or percentage of black frame insertion may vary. For example, three black frames, (e.g., 30%), four black frames, (e.g., 40%), or five black frames, (e.g., 50%) may be utilized.

Figure 5:
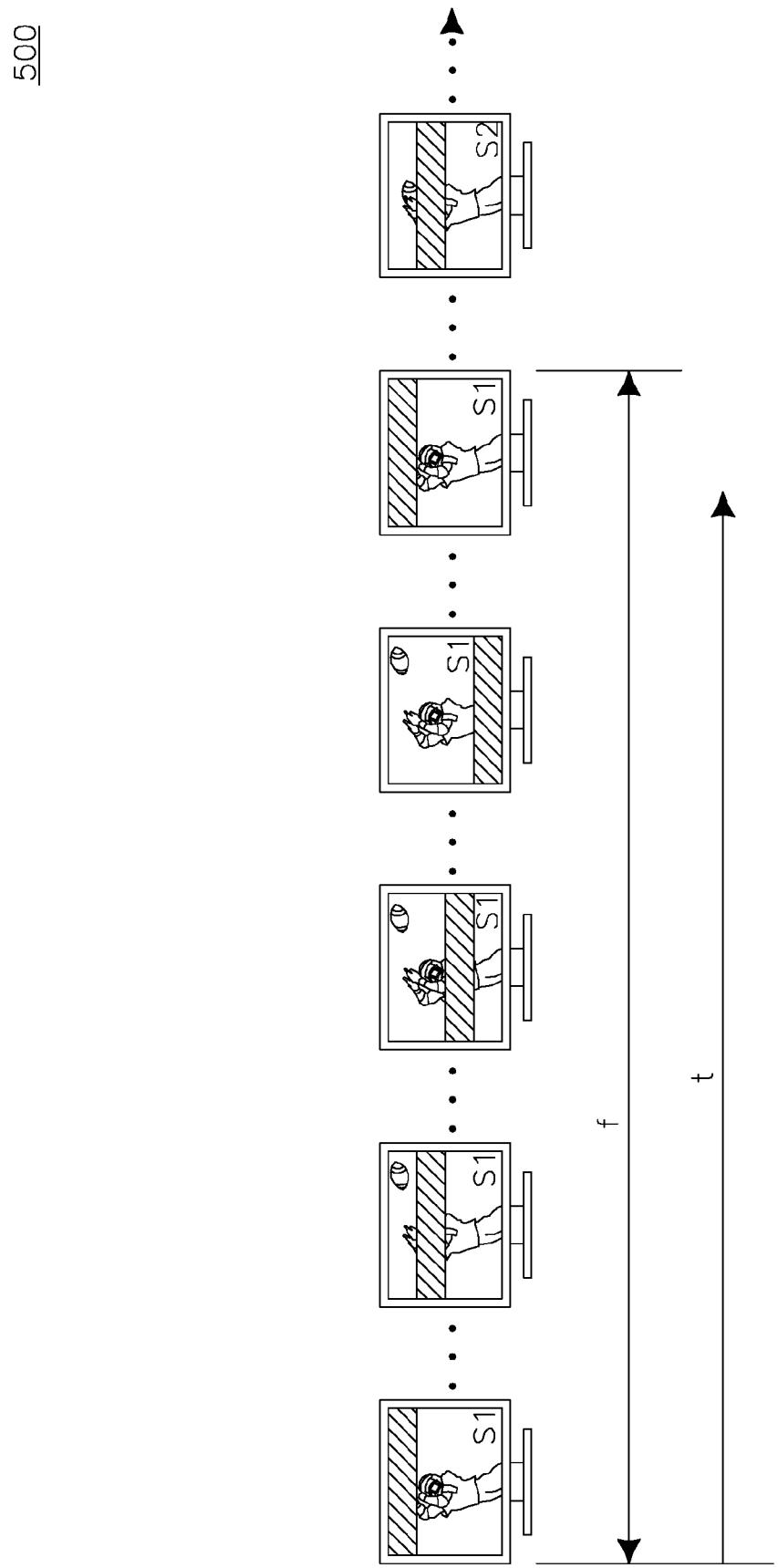

FIG. 5 is a graphical representation 500 of an example method of another dejuddering method. As shown in FIG. 5, the first frame (S1) is repeated, for example, five times over the period 'f'. If motion compensated frame interpolation is utilized, then the first frame (S1) and subsequent frames, (e.g., S2), may not have to be repeated. In that case, an interpolation frame may be inserted between S1, S2 and subsequent frames.

During each display of the first frame (S1), a portion of the frame is blacked out, with the portion of the frame blacked out scrolling down or across the display 120 until the blacked out portion has traversed the entire display screen over the duration of that frame. For example, the blacked out portion may originate as a single horizontal line at the top of the display screen that is blacked out. The blacked out line then transfers to each successive line below until only the bottom line is blacked out at or near the end of the first display of the first frame (S1). The process then repeats for the next successive frame S2.

The same process of blacking out continues for each successive display of the first frame (S1). For purposes of example, FIG. 5 shows the different portions of the display being blacked out during each successive display of the first frame (S1). It is to be understood, however, that the process of blacking out each frame involves the progressive blacking out of portions of the display screen until by the end of each frame display, all portions have been blacked out at some point. In addition, FIG. 5 shows the scrolling of the blacked out portion beginning at the top of the display screen and progressively scrolling down the screen, but it should be understood that the blacked out portion may scroll from one side of the screen to another, as well.

It should be also be noted that, for example purposes, a portion appearing to be one-quarter of the display is shown as being blacked out. However, different portions or ratios of the display may be blacked out. As described above, it could be a single horizontal or vertical line that is blacked out and scrolled across the screen. This method can also be performed for 240 Hz or higher frame rate displays.

Figure 6:
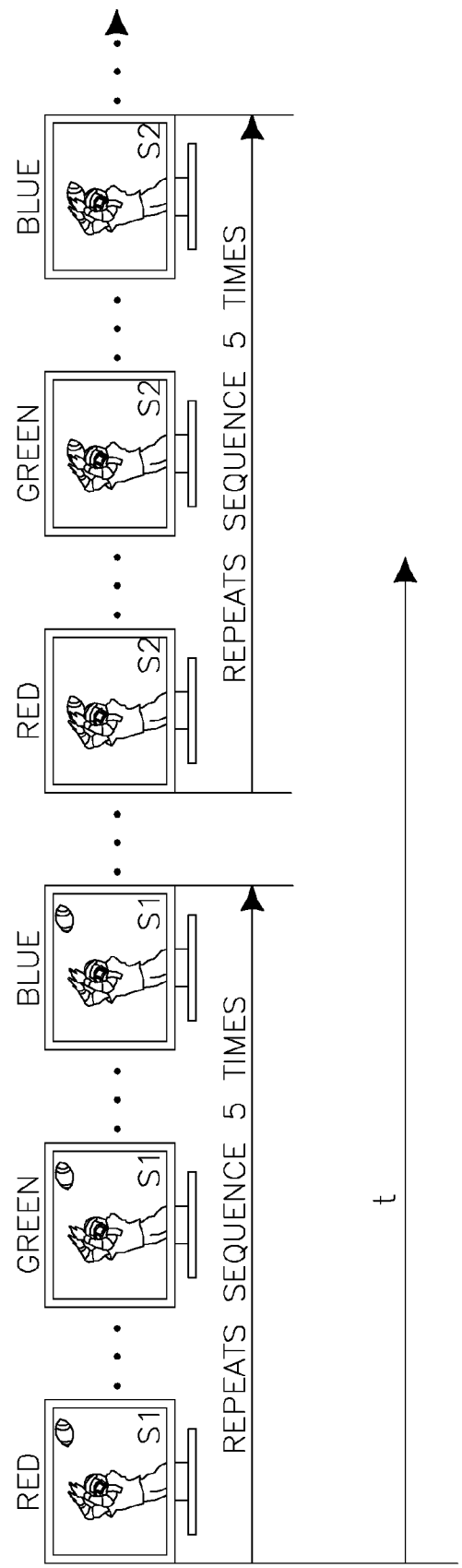

FIG. 6 is a graphical representation 600 of another example method of dejuddering. As depicted in FIG. 6, the display of the colors utilized by the display 120 are sequenced. For example, the first frame (S1) is displayed in Red, Green, and Blue, and this sequence is repeated a certain number of times, such as five. The next frame (S2) is then displayed in the same color sequence as S1, as is each successive sequence. In addition, each frame may also include some portion of the frame being blacked out as described above in FIG. 5. This method may also be performed for 240 Hz or higher frame rate displays. For a 120 Hz display, the frames may be repeated over a period of 1/120 of a second.

Figure 7:
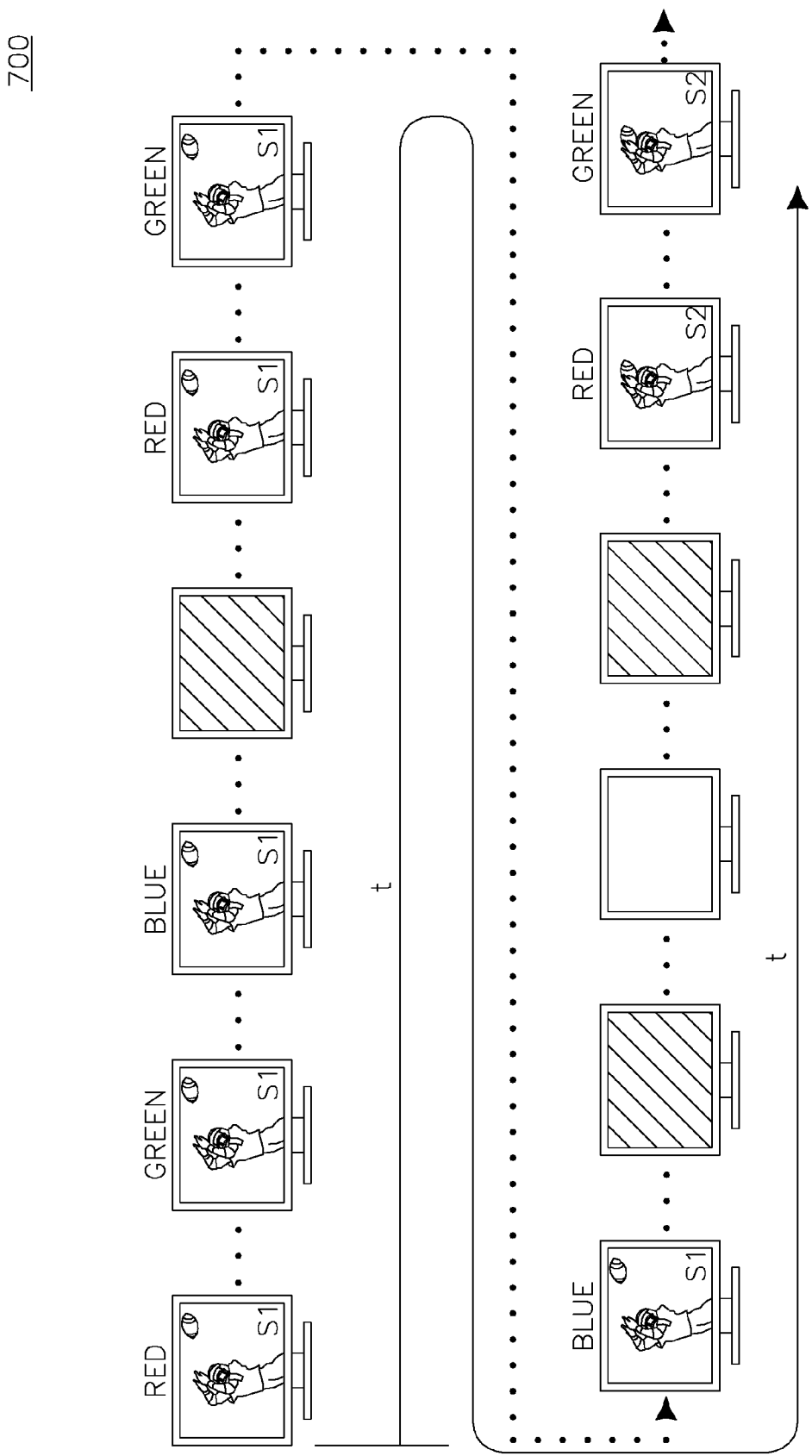

FIG. 7 is a graphical representation 700 of another example method of dejuddering. As depicted in FIG. 7, the first frame (S1) is displayed in Red, Green, and Blue, and then a black frame is inserted. Frame S1 is repeated again in Red, Green, and Blue, and then a black, white, and black sequence of frames is inserted. The next successive frame (S2) is then displayed in the same sequence as S1. The sequence also continues for each successive frame. In addition, each frame may also include some portion of the frame being blacked out as described above in FIG. 5. This method may also be performed for 240 Hz or higher frame rate displays. In addition, a white frame can be inserted prior to any one of, or all of, the black frames. This insertion of a white frame may aid in compensating for a brightness loss.

In each example scenario depicted above in FIGS. 3 through 7, the black frame insertion may be inserted using a variety of techniques. For example, the charge sharing time may be utilized to insert the black frame. That is, the time when the row of pixels is connected to a capacitor through a switch to compensate for the voltage difference between their sources and ground. For each frame, the charge sharing time can be 10%-30% of the frame time. One example of how the frame insertion block 112 of the processor 110 can perform this way of insertion is by including a change to a timing controller (TCON) signal, that would indicate when a certain portion, or all, of a display is to be blacked out.

Additionally, a modification may be made to the starting vector signal (STV), where two STVs are utilized in a single frame time. One STV would include the source image data, (e.g., S1, S2, etc.), and the other STV includes the black image data.

In another alternative, video processing techniques to display a black screen may be utilized by the frame insertion block 112.

In another alternative, the entire display 120, or portions thereof, may be blacked out by switching on or off the backlight CCFLs or light emitting diodes (LEDs) in the display. For example, all of the CCFLs/LEDs may be switched off to insert an entire screen black frame. Similarly, to perform the method described above in FIG. 5, particular CCFLs/LEDs may be cycled on and off in sequence to black out various portions of the display 120 at desired times. This may be achieved by the use of a timing control circuit and switch to power on and off the particular CCFLs/LEDs that are desired to be controlled. In addition, this technique can be also performed with a black frame insertion.

Although the features and elements of the present invention are described in the example embodiments in particular combinations, each feature or element can be used alone without the other features and elements of the example embodiments or in various combinations with or without other features and elements of the present invention. The present invention may be implemented in a computer program or firmware tangibly embodied in a computer-readable storage medium having machine readable instructions for execution by a machine, a processor, and/or any general purpose computer for use with or by any non-volatile memory device. Suitable processors include, by way of example, both general and special purpose processors.

Typically, a processor will receive instructions and data from a read only memory (ROM), a RAM, and/or a storage device having stored software or firmware. Storage devices suitable for embodying computer program instructions and data include all forms of non-volatile memory, including by way of example semiconductor memory devices, read only memories (ROMs), magnetic media such as internal hard disks and removable disks, magneto-optical media, and optical media such as CD-ROM disks and digital versatile disks (DVDs). Types of hardware components, processors, or machines which may be used by or in conjunction with the present invention include Application Specific Integrated Circuits (ASICs), Field Programmable Gate Arrays (FPGAs), microprocessors, or any integrated circuit.

What is claimed is:

1. A method of dejuddering image data, comprising:
receiving a video data signal wherein the video data signal includes a first source frame and a plurality of successive source frames;
displaying the first source frame a first predetermined plurality of times;
displaying a first black frame a second predetermined number of times;
redisplaying the first source frame the first predetermined plurality of times;
redisplaying the first black frame the second predetermined number of times; and
displaying a successive source frame a third predetermined plurality of times.

2. The method of claim 1 wherein the first predetermined plurality of times the first source frame is displayed is four times.

3. The method of claim 1, further comprising converting the video data signal.

4. The method of claim 3 wherein the video data signal is converted to a twenty-four hertz (Hz) progressive image data signal.

5. The method of claim 1 wherein the black frame is displayed by switching off at least one backlight to a display device.

6. The method of claim 5 wherein all backlights are switched off.

7. The method of claim 5 wherein a plurality of backlights are switched off.

8. A method of dejuddering image data, comprising:
receiving a video data signal wherein the video data signal includes a first source frame and a plurality of successive source frames;
displaying consecutively one of a red image, green image, and blue image sequence of the first source frame a first predetermined number of times;
displaying a first black frame;
displaying consecutively the one of the red image, green image, and blue image sequence of the first source frame a second predetermined number of times;
displaying a second black frame; and
displaying consecutively one of a red image, green image, and blue image sequence of a successive source frame a second predetermined number of times.

9. The method of claim 8 wherein the red image, green image, and blue image sequence of the first source frame and the plurality of successive source frames are each displayed five times.

10. The method of claim 8 wherein each of the displayed red image, green image, and blue image include a portion of a black frame.

11. The method of claim 8, further comprising:
displaying a second black frame;
displaying a white frame; and
displaying a third black frame.

12. A processor for dejuddering image data, the processor comprising:
a frame insertion block, wherein the frame insertion block is configured to display a first source frame of a plurality of successive source frames a first predetermined plurality of times, display a first black frame a second predetermined number of times, redisplay the first source frame the first predetermined plurality of times, redisplay the first black frame the second predetermined number of times and display a successive source frame a third predetermined plurality of times.

13. The processor of claim 12, further comprising a conversion block in communication with the frame insertion block, the conversion block configured to receive a video data signal wherein the video data signal includes the plurality of successive source frames, and convert the video data signal to a twenty-four hertz (Hz) progressive image data signal.

14. The processor of claim 12 wherein the frame insertion block is further configured to consecutively display one of a red image, green image, and blue image sequence of the first frame of the plurality of source frames the first predetermined plurality of times, display the first black frame, and consecutively display one of a red image, green image, and blue image sequence of a successive source frame the third predetermined plurality of times.

15. The processor of claim 14 wherein the red image, green image, and blue image of each of the plurality of source frames include a portion of a black frame.

16. The processor of claim 14 wherein the frame insertion block is further configured to display a second black frame, a white frame, and a third black frame.

17. A non-transitory computer-readable storage medium containing a first set of instructions, which, when executed by a processor, allow the processor to:
receive a video data signal wherein the video data signal includes a first source frame and a plurality of successive source frames;
display the first source frame a first predetermined plurality of times;
display a first black frame a second predetermined number of times;
redisplay the first source frame the first predetermined plurality of times;
redisplay the first black frame the second predetermined number of times; and
display a successive source frame a third predetermined plurality of times.

* * * * *